United States Patent [19]

Newman

[11] 4,039,711

[45] Aug. 2, 1977

[54] NON-WOVEN FABRICS

[75] Inventor: Nicholas S. Newman, West Newton, Mass.

[73] Assignee: The Kendall Company, Boston, Mass.

[21] Appl. No.: 362,450

[22] Filed: May 21, 1973

Related U.S. Application Data

[63] Continuation-in-part of Ser. No. 150,593, June 7, 1971, abandoned.

[51] Int. Cl.² .............................................. B32B 27/00
[52] U.S. Cl. .................................... 428/286; 428/287; 428/288; 428/296
[58] Field of Search ............... 161/150, 152, 157, 169, 161/170; 428/286, 287, 288, 296

[56] References Cited

U.S. PATENT DOCUMENTS

| 3,595,731 | 7/1971 | Davies | 161/157 |
| 3,649,428 | 3/1972 | Hughes | 161/152 |
| 3,669,823 | 6/1972 | Wood | 161/157 |
| 3,770,562 | 11/1973 | Newman | 161/157 |

Primary Examiner—Marion E. McCamish
Attorney, Agent, or Firm—Edward J. Scahill, Jr

[57] ABSTRACT

Thin nonwoven fabrics of high resistance to elongation are produced by bonding fibrous webs comprising staple thermoplastic fibers to each face of a spun-bonded web of entangled and interlaced continuous filaments, wherein substantially all of the filaments of the spun-bonded web are in bonding contact with the thermoplastic fibers of the fibrous webs.

4 Claims, 1 Drawing Figure

NON-WOVEN FABRICS

CROSS REFERENCE TO RELATED APPLICATIONS

This application is a continuation-in-part of my earlier copending application Ser. No. 150,593, filed June 7, 1971, now abandoned.

BACKGROUND OF THE INVENTION

This invention relates to nonwoven fabrics with a high modulus of elongation. More particularly, it relates to nonwoven fabrics suitable for use in the electrical insulation field, and to a process for preparing such fabrics.

In the insulation of electrical equipment, as for example in the armature winding and slot lining of generators, maintenance of continuity of insulating value is of prime importance. The primary insulating materials, such as varnishes, epoxy resins, or mica, and the like, do not form self-sustaining manipulatable sheets of enough strength to allow their application to electrical parts. Such materials therefore are commonly mounted on a supportive base such as glass cloth, nonwoven fabrics, special papers and the like.

Supportive bases of this type must possess, as a primary requisite, a high degree of resistance to elongation or deformation under the stresses developed during the application of the insulating material and during the use of the equipment, which customarily involves elevated temperatures. If the base materials stretches or deforms under low or moderate stresses, the non-elastic varnish or resin coating may develop cracks, leading to electrical leakage and loss of insulating value.

This is especially true when the primary insulating material is mica, highly desired because of its unique combination of electrical, thermal, and mechanical properties. One form of primary insulation is a mica paper, made of natural mica comminuted into finely-divided form and reconstituted into a sheet of overlapping, horizontally stratified platelets. The overlapping mica platelets form an excellent insulating medium, so long as their overlapping relationship is maintained. Such sheets, however, have little strength, and are generally mounted on a strong supportive base by means of a resin, such as an epoxy, securing the mica sheet to a glass cloth.

With the constant demand for more compact electrical components, there is a concomitant demand for insulating materials of high efficiency and decreased thickness. The fabrication of ultra-thin glass fabrics is expensive and cumbersome, so that on a practical basis, nonwoven fabrics are becoming more and more widely used in the development of thin, economical, base supports for layers of electrical insulation.

In addition to thinness, however, the nonwoven fabric must, for reasons set forth above, possess what may be called a "high modulus": that is, a high degree of resistance to elongation under stress. The modulus of elongation is derived from the slope of the elongation portion of the stress-strain curve, and for convenience herein will be referred to as the pounds of tensile stress which must be applied to a one inch wide strip of fabric to cause a specified elongation, usually between 2% and 4%.

A prior art product is shown in Davies et al, U.S. Pat. No. 3,595,731, comprising a web of polymeric material having a sheet such as nylon or polyethylene bonded to each face of the web. However, this adhesively bonded web does not have a high resistance to elongation, and the filaments (fibers) in the web are not held against displacement by the nylon or polyethylene sheets thereon. It is with improvements in the art of preparing such base fabrics that the present invention is concerned.

It is a primary object of the invention to prepare a thin, compliant nonwoven fabric with a high modulus of elongation.

SUMMARY OF THE INVENTION

A thin, nonwoven laminate of high resistance to elongation has a spun-bonded web of entangled and interlaced synthetic polymeric continuous filaments sandwiched between fleeces of textile-length staple thermoplastic fibers and wherein substantially all of the filaments of the spun-bonded web are in bonding contact with the thermoplastic fibers of the fleece. A synergestic fiber-filament reinforcement is developed therein so that the modulus of the laminate is almost double that of the moduli which could be predicted from the behavior of the above two components treated separately.

BRIEF DESCRIPTION OF THE DRAWINGS

The figure is an idealized and highly magnified representation of the top elevation of a nonwoven laminate produced according to this invention.

DESCRIPTION OF THE PREFERRED EMBODIMENTS

Figure 1:
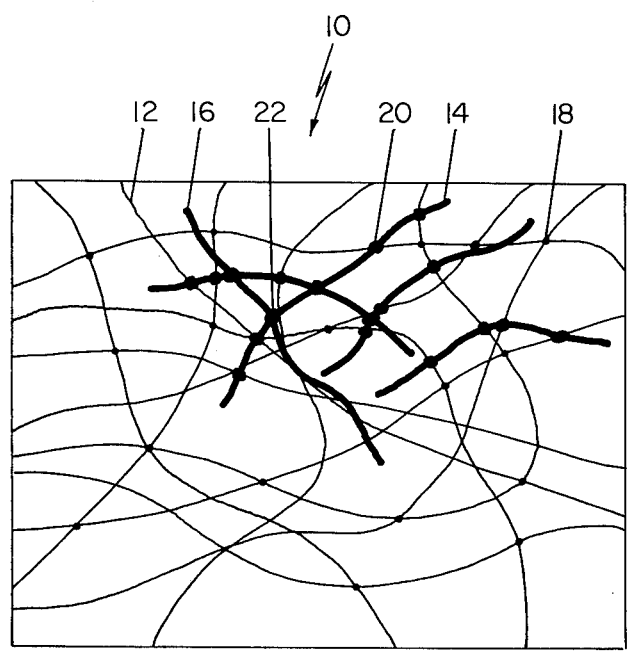

An unbonded or lightly bonded web of continuous filaments of the type known as a "spun-bonded" web is subjected to heat and pressure in contact with webs comprising staple-length thermoplastic fibers so as to produce a thin nonwoven laminate of high resistance to elongation.

A spun-bonded web herein is defined as a web or nexus of substantially continuous synthetic filaments resulting from the deposition of polymeric filaments directly from a bank of spinnerettes onto a conveyor belt. The type of spun-bonded web of particular utility in this invention is one wherein the entangled and interlaced filaments are either unbonded, or are lightly bonded for handling purposes, where a certain low degree of tensile strength is desirable to allow the web to be wound and unwound for further processing. This is conveniently accomplished by the application of heat and pressure to the web at a set of discrete and spaced-apart points, thus effecting an autogenous bonding of filament to filament in selected areas.

By staple-length fibers is meant textile fibers of such length — customarily one-quarter inch to five or six inches — as to allow them to be assembled into a fibrous fleece on dry-laying equipment such as a card, garnett, air-lay machine, or the like.

In FIG. 1, only a few fibers and filaments are shown for clarity purposes, and the laminate 10 is seen to comprise a spun-bonded network of substantially continuous filaments 12 in cursive, criss-crossing, and entangled relationship. In the spun-bonded webs useful for the practice of this invention, the filaments of the web may be bonded to each other, as mentioned above, in a set of discrete and spaced apart points 18. The filaments of the web, however, have considerable freedom of movement with respect to each other, and the web is characterized by a rather low tensile strength of 2 or 3 pounds per inch-wide strip. It is also characterized by a stress of less than one pound per inch-wide strip being sufficient to elongate the web by 3% to 4%.

Superimposed upon and bonded into each face of this loosely-assembled filamentary network are fleeces of staple fibers of textile length, comprising thermoplastic fibers 14 and non-thermoplastic fibers 16. The thermoplastic fibers may be of the polyolefin type, of polyvinyl chloride-polyvinyl acetate copolymer, of plasticized cellulose acetate, or may be any of the other types of thermoplastic fibers known in the art of bonding fibrous fleeces by means of heat and pressure.

In the preparation of fabrics suitable for use in the electrical insulation field, however, it is preferred that the thermoplastic fibers be undrawn polyester fibers — that is, polyester fibers in a relatively unoriented and amorphous state, and with little or no evidence of crystallinity in their x-ray diffraction pattern. Such fibers have a temporary melting or softening point well below the softening point of polyester fibers which have been drawn (usually 3 to 5 times) until they have been transformed to an oriented state with a definite crystalline x-ray diffraction pattern.

Preferably, a blend of undrawn thermoplastic fibers 14 and non-thermoplastic fibers 16 is employed. The non-thermoplastic fibers may be of any type of staple textile-length fibers which do not soften or become adhesive at the temperatures at which the thermoplastic fibers soften.

For the preparation of fabrics suitable for use in this invention, the non-thermoplastic fiber of choice is drawn, oriented polyester fiber. Blends of as little as 25% undrawn — 75% drawn polyester fiber give nonwoven laminates with substantially increased moduli of elongation, with 40% to 60% undrawn — 60% to 40% drawn polyester fibers being a preferred range. For special purposes, the percentage of thermoplastic, undrawn polyester fibers may be increased to 100%. By selecting a spun-bonded base web of polyester filaments and superimposed fleeces of polyester fibers, a laminate can be produced the electrical properties of which are especially suitable for combining with mica platelets in paper form to form insulating nonwoven fabrics.

Combination of the spun-bonded web and the staple-length fibrous fleeces is most readily accomplished by passing the plied assembly through a heated calender, at a temperature and pressure sufficiently high as simultaneously to soften the thermoplastic fibers, and to bind them in bridging relationship to the non-thermoplastic fibers and to the filaments of the spun-bonded web so that substantially all of the filaments of the spun-bonded web are in bonding contact with the thermoplastic fibers of the fleece. Such a bonding relationship is shown in FIG. 1, where a thermoplastic staple fiber 14 is shown bonded to a continuous filament as at 20, and also bonded to a non-thermoplastic staple fiber 16 as at 22. However, as pointed out earlier herein, only a few fibers and filaments are shown in the drawing for clarity purposes.

The invention may be illustrated by the following example.

EXAMPLE 1.

A spun-bonded web of polyester filaments, lightly bonded at a set of spaced-apart points, (Reemay type, du Pont trademark for spun-bonded polyester webs) weighed 14 grams per square yard. It had a low tensile strength, 0.43 pounds machine direction and 0.37 pounds cross direction, per 1-inch strip, and was readily elongated under stress.

To test the effect of heat and pressure on such a spun-bonded web alone, it was hot calendered between a steel roll heated to 400° F and a cotton roll heated to 325° F, at 400 pounds pressure per inch of nip. Although the autogenous bonding of filament to filament was somewhat increased, at a modest stress of only 0.6 pounds per inch-wide strip the calendered web elongated over 3%.

A pair of 15 gram carded fleeces consisting of 60% 1.5 inch drawn polyester fibers — 40% 1.5 inch undrawn polyester fibers were plied together. In the carded state, the assembly had of course zero strength. When calendered under the same conditions as the spun-bonded web above, a stress of 6 pounds per inch-wide strip was needed to elongate the 30 gram nonwoven fabric by 3.3%. In nonwoven fabrics for use in electrical insulation wrappings, as set forth above, this elongation modulus is intermediate, and is not sufficiently high to guard against cracks and leakage developing in application or use. The German Pat. No. 1,117,079 also shows a fleece of polyester fibers used for electrical insulating purposes that likewise is not sufficient for guarding against cracks and leaks developing in application or use.

However, when each of the above 15 gram carded fleeces was applied to the faces of the above uncalendered spun-bonded web and the three-layer assembly was calendered as a unit, instead of calendering the elements separately, the modulus of elongation showed a dramatic and unexpected increase, to 11 pounds at 3.3% elongation. Thus the result of calendering the web and the fleeces as a unit nearly doubled the strength which would be expected from the behavior of the web and fleeces when calendered separately.

The exact reason for such an unexpected reinforcement against elongation is not thoroughly understood. It is believed that the shorter thermoplastic fibers exert a bridging effect when bonded to the interlaced and more or less randomly distributed filaments of the spun-bonded web, limiting the ability of the filaments to readjust to applied stresses.

Therefore, for the preparation of high modulus nonwoven products according to this invention it is essential that substantially all of the filaments of the spun-bonded web be brought into bonding contact with the thermoplastic fibers of the carded fleece. For this reason, it is preferred that the filamentary web be a light weight type, not more than 30 grams per square yard in weight and not more than 10 mils in thickness as measured by a Starrett gauge Type 170; and, a carded fleece of textile fibers comprising thermoplastic fibers should be applied to each face of the spun-bonded web, to insure maximum fiber-to-filament bonding.

Since it is obvious that many changes and modifications can be made in the above-described details without departing from the nature and spirit of the invention, it is to be understood that the invention is not limited to said details except as set forth in the appended claims.

What is claimed is:

1. A thin nonwoven laminate of high resistance to elongation which comprises:
   a spun-bonded web of entangled and interlaced synthetic polymeric continuous filaments, said spun-bonded web being a lightly bonded network of filaments weighing not over 30 grams per square yard and being not more than 10 mils in thickness; and, a fleece of textile-length staple fibers consisting of thermoplastic and non-thermoplastic fibers being disposed on each face of said spun-bonded web, substantially all of the filaments of said spun-bonded web being bonded to and in bonding contact with said thermoplastic fibers of said fleece.

2. The nonwoven laminate of claim 1 wherein said continuous filaments are polyester filaments.

3. The nonwoven laminate of claim 2 wherein said fleece of textile-length fibers comprises intermingled drawn and undrawn polyester fibers, said undrawn polyester fibers serving as bonding thermoplastic fibers.

4. The nonwoven laminate of claim 3 wherein said fleece of textile-length fibers comprises 40% – 60% undrawn polyester fibers and 60% – 40% drawn polyester fibers.

* * * * *